F. PURDY.
CONTROLLING DEVICE FOR INTERNAL COMBUSTION ENGINES.
APPLICATION FILED NOV. 15, 1915.

1,246,319.

Patented Nov. 13, 1917.

Witnesses:
Robert H. Weir
Arthur W. Carlson

Inventor:
Frederick Purdy
Foree Bain May
Attys

UNITED STATES PATENT OFFICE.

FREDERICK PURDY, OF CHICAGO, ILLINOIS, ASSIGNOR OF ONE-HALF TO FORÉE BAIN, OF LA GRANGE, ILLINOIS.

CONTROLLING DEVICE FOR INTERNAL-COMBUSTION ENGINES.

1,246,319.      Specification of Letters Patent.      Patented Nov. 13, 1917.

Application filed November 15, 1915. Serial No. 61,486.

*To all whom it may concern:*

Be it known that I, FREDERICK PURDY, a citizen of the United States, residing at Chicago, in the county of Cook and State of Illinois, have invented certain new and useful Improvements in Controlling Devices for Internal-Combustion Engines, of which the following is a specification.

One of the objects of my present invention is to improve the apparatus necessary for carrying into effect my invention, as disclosed in my copending application, originally filed December 8th, 1911, and bearing Serial No. 666,324, renewed June 25th, 1915, and bearing Serial No. 36,411 for a control system for internal combustion engines.

In the prior application, I have heretofore very fully set out and explained one device embodying my invention, and the advantages and economy to be gained in the operation of an internal combustion engine by the use of said device and the practice of said invention. In this application I shall confine the description more particularly to the details of construction of some of the devices within the scope of the appended claims.

In the preferred form of device, and in each of the modifications herein disclosed, there is present the joint association and coöperation of an engine spark-producing means; a speed responsive means and a fuel control means, working in harmony to efficiently control the operation of an internal combustion engine to produce smoothness of operation and to effect economy of fuel consumption.

Another and more specific object of my present invention is to provide a unitary or self contained structure, comprising a rotary spark distributer, and a speed responsive device, combined and organized so as to be rotated about a common axis and influenced by the fuel control means, to the end that the three devices coöperate harmoniously to produce the best and most efficient operation of an engine.

Other and further objects of my invention will become readily apparent to persons skilled in the art, from a consideration of the following description when taken in conjunction with the drawings, wherein:—

Figure 1 is a vertical central section of a spark distributer or igniting device and a speed responsive device, organized and constructed into a single entity so that they may be placed about or secured to a single rotary shaft.

Fig. 1ª is a schematic arrangement of the various parts, reduced to the simplest form, to diagrammatically and more clearly illustrate the more complex structure shown in Fig. 1.

Fig. 2 is a transverse section taken on line 2—2 of Fig. 1.

Fig. 10 is a central vertical section, of a modified device, wherein the amount of spring displacement is varied by leverage variation opposing the movement of the speed responsive governor.

Fig. 10ª is a simplified, diagrammatic illustration of the device shown in Figs. 10-16.

Fig. 11 is a transverse section taken on line 11—11 of Fig. 10.

Fig. 17 is a central vertical section of another modification, or form which my invention may take, wherein the velocity of the speed responsive device is adjustably varied, for varying the speed movement or displacement of a part of the igniting device, for the purpose of advancing or retarding the spark when the fuel control means is moved, as will hereinafter be more fully described.

Fig. 17ª is a diagrammatic illustration of the device as shown in Figs. 17–19.

Fig. 18 is a transverse section taken on line 18—18 of Fig. 17.

Fig. 19 is a transverse section taken on line 19—19 of Fig. 18.

In all the views the same reference characters are employed to indicate similar parts.

In the drawings, there is shown a preferred form of my device and several modifications thereof, in all of which the spark-time controlling mechanism is associated with a speed responsive device rotatable about a common axis, and influenced, or modified in its operation, by a connection between the fuel controlling means, or carbureter, and said associated devices.

Figures 1, 1A, 2:
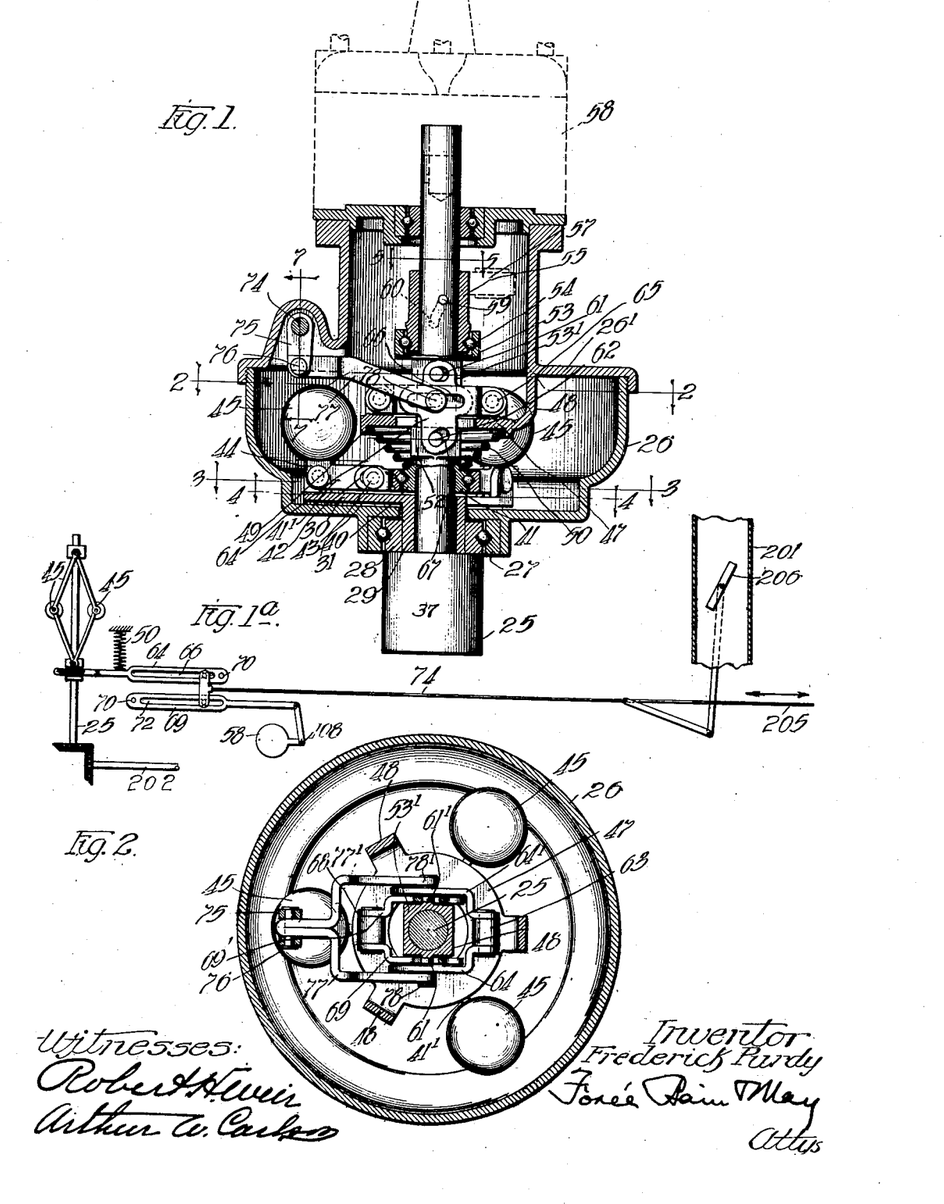
Figure 3:
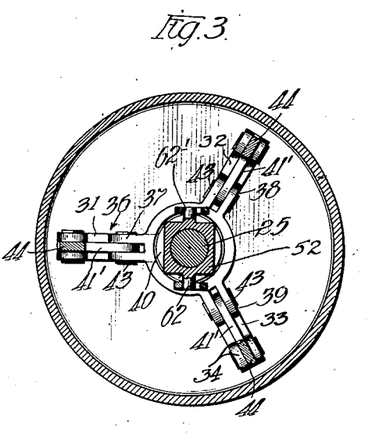
Fig. 3 is a section taken on line 3—3 of Fig. 1.
Figures 4, 6, 7, 8, 9:
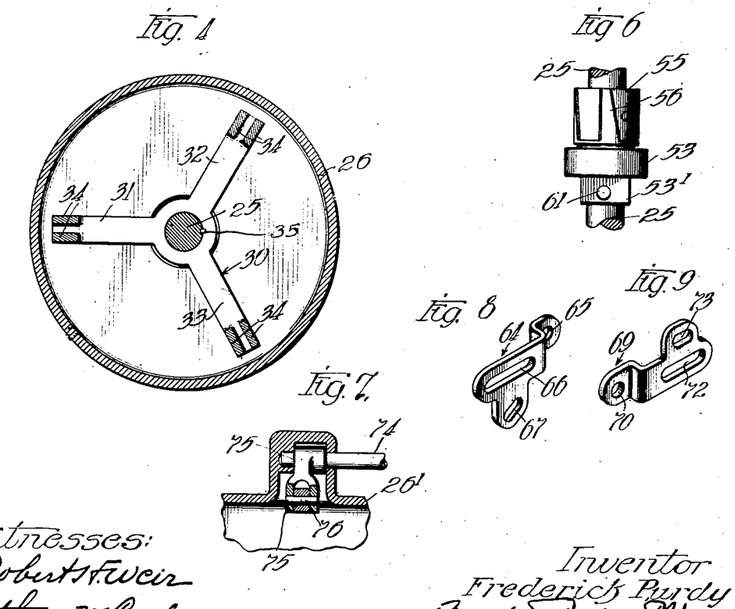
Fig. 4 is a section taken on line 4—4 of Fig. 1.
Fig. 6 is a fragmentary side elevation of the primary circuit breaker device, of the spark timing means, as shown in Fig. 5.
Fig. 7 is a transverse section taken on line 7—7 of Fig. 1.
Figs. 8 and 9 are persepctive views of link members whereby the effectiveness of the spring of the speed responsive device may be changed by varying the ratio of movement of the levers through which it operates without modifying its actual strength.
Figure 5:
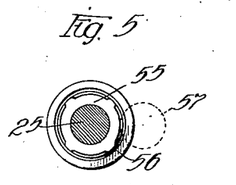
Fig. 5 is a section taken on line 5—5 of Fig. 1.

Referring now more particularly to Fig. 1, 25 is a vertical shaft, preferably driven by the cam shaft, about which and with which the apparatus mounted thereon rotates.

A casing 26 is provided with an annular ball bearing 27, the inner raceway 28 of which is mounted upon the hub 29 of a spider 30. The spider 30 is provided with radiating arms 31, 32 and 33, each of which has two upturned spaced apart ears 34 upon their extreme ends and each of which carries a pivoted inertia ball or weight 45. The spider 30 is secured to the shaft 25 by means of a key 35 so that it will be positively rotated with the shaft. Immediately above the spider 30 is another spider 36 provided with shorter bifurcated arms 37, 38 and 39. The spider 36 carries a ball bearing 40 for rotation about the shaft 25. The inner raceway 41, of the ball bearing, is loose on the shaft 25 and the outer raceway carries the spider 36 which is connected to the spider 30, by the links 41', the inner ends of which are slotted as at 42. Pins 43 secured to the bifurcated arms 37, 38 and 39, pass through the slots 42 of the respective arms. The links 41' are upturned, as at 44, and each carries upon its upper portion, an inertia weight or governor ball 45.

A stationary ring 47 is supported about the shaft 25 by arms 48 secured to the upper separable portion 26' of the casing. The ring 47 is counterbored on its under face to provide a rim or flange 49 within which to seat an open tapered helical spring 50 and to provide a fixed abutment therefor.

The lower, or smaller end of the spring 50, rests upon the inner raceway 41 of the ball bearing 40. A rectangular sleeve 52, preferably forming a part of the inner raceway of ball bearing member 40 and loose upon the shaft 25, is connected to a part 53 by leverage changing links, to which reference will be made.

Another sleeve 55, is provided with radial projections 56 corresponding in number with the number of cylinders in an engine with which the device is to be used, and comprises with its associated parts the primary circuit breaker or, as it is more commonly termed the spark timer. The contact operating lever engaged at its free end by the projections 56 is shown in dotted lines, as at 57. The lower end of sleeve 55 projects within the part 53 and is connected thereto for axial movement therewith by means of the interposed annular ball bearing 54. The sleeve 55 is provided with a lost motion drive on the shaft 25, comprising the pin 59 which passes into an upwardly inclined slot 60 made in the sleeve 55 so that when the sleeve or primary circuit breaker 55 is lifted on the shaft 25, the pin 59 of the slot 60 will give the sleeve 55 a slight rotary motion in a forward direction, due to the inclination of the slot, so that a given radial point on the sleeve 55 will be displaced by operation of the speed responsive device, forwardly, with reference to a given point on the shaft 25, while both parts are being bodily rotated in a given direction. This relative rotary displacement of the rotating driving and driven parts alters the cyclic time of the spark, advancing or retarding the same as occasion may demand.

When the sleeve 55 is raised, by operation of the governor balls 45, in a manner to be hereinafter more fully explained, the roller 57 of the circuit breaker will then pass over a wider portion of the projections 56, and the device then rotating at a higher speed, the time of dwell of the circuit breaker wheel 57 upon the projection 56 will be practically the same, making the period of time that the circuit is closed substantially constant. When the roller 57 passes over a narrow portion of the projection 56 from the sleeve 55, said sleeve is then rotating at a lower speed, thus providing means for maintaining the primary circuit closed for a substantially equal definite period of time irrespective of the speed of the device.

Below the member 53 is a squared or rectangular sleeve 53', which is preferably an integral part thereof, and which is loose upon the shaft 25. From each side of the part 53' laterally project, studs 61, 61'.

Similar studs 62, 62' project from the squared sleeve 52.

Pivoted to an ear 63, rising from the ring 47, are a pair of links 64 and 64'. These links are pivoted to the ear through the perforation 65 and are each provided with elongated slots 66 and an oblique slot 67. The slot 67, of each of the links 64—64', overlies the studs 62—62', respectively, which project laterally on either side of the squared part 52. This is more clearly shown in Fig. 1.

Rising vertically from the ring 47, on the opposite side of its diameter, is an ear 68 to which are pivotally connected links 69—69'. These links are pivoted, as by the perforations 70 and are each provided with an elongated slot 72 in register and corresponding substantially in extent with the slots 66 in the links 64, and another slightly shorter slot 73 thereabove. The slot 73, of the links 69—69' overlie the studs 61, 61' that project laterally from the part 53', and thus the parts 52 and 53' are loosely joined together as when the links 64 and 69 are properly associated.

Passing through the upper portion 26' of the casing, is a rotatable shaft 74, on the end of which is a crank arm 75.

Pivoted to the crank 75, as by means of a pin 76, is a link member having forked ends 77—77'. On the ends 77—77' of the link are two inwardly projecting studs 78—78'. These studs project into and through the elongated slots 66 and 72 of the links 64, 64' and 69, 69'. A distributer is indicated in dotted lines as mounted at 58 on the upper end of the shaft 25.

In this particular embodiment the shaft 74 is rotated upon its axis when the carbureter fuel control means is moved for varying the supply of fuel to the engine, and this moves the link ends 77 and 77' so as to modify the operation of the speed responsive device with reference to the rotation of the spark timing mechanism 55—57.

Looking at Fig. 1, when the shaft 74 is rotated to move the crank arm 75 to the right, the link, composed of the arms 77 and 77' is moved thereby upon the pivotal joint 76 so that the studs 78 and 78', secured in the ends of the respective arms, are longitudinally moved in the slots 66 and 72, of the links 64 and 69. The member 52, in its vertical movement by the speed governor, with reference to the shaft 25, communicates its movement to the member 53', the upward movement of which slightly rotates the sleeve 55' rearwardly by the slot and pin connection with the shaft, by means of the links 64—64', through the links 69—69'.

When the crank arm 75 is moved to the right, in the manner described, the leverage ratio between the speed responsive device and the sleeve 55, is, by the compound link connection changed. The studs 78—78' having been moved to the right, with reference to the axes of the connecting links 69 the operation of the speed responsive governor is taking effect on the links 69—69' at a longer distance from the fulcrum 70, and therefore the inertia balls 45 must move a shorter distance to lift the sleeve 55 and thereby rotate it a given distance, but if the crank arm 75 be moved in the opposite direction, that is to the left, by rotation of the shaft 74, then the action of the speed responsive device upon the sleeve 55 is effected through the link 69 at a shorter leverage and therefore the sleeve 55 will be moved a greater distance, for the same distance of movement of the inertia balls 45, of the speed responsive device, and thus the rotation of the shaft 74 has the effect to modify the speed responsive device with reference to the operation of the spark timing device.

In the modification shown in Figs. 10 to 15 inclusive the spring 50 which yieldingly resists or acts against the speed responsive device, tends to hold the vertically moving mechanism, that rotates the sleeve 55, in an upward position against the operation of the balls 45 of the speed responsive device. The rotation of the shaft 74, through the connecting mechanism, increases or decreases the effect of the spring 50 to resist the centrifugally operated balls 45 in accordance with the position that the studs 78—78' of the links 77—77' occupy in the slots 66 and 72 of the links 69—69' and 64—64', respectively.

Figures 10, 10A, 11:
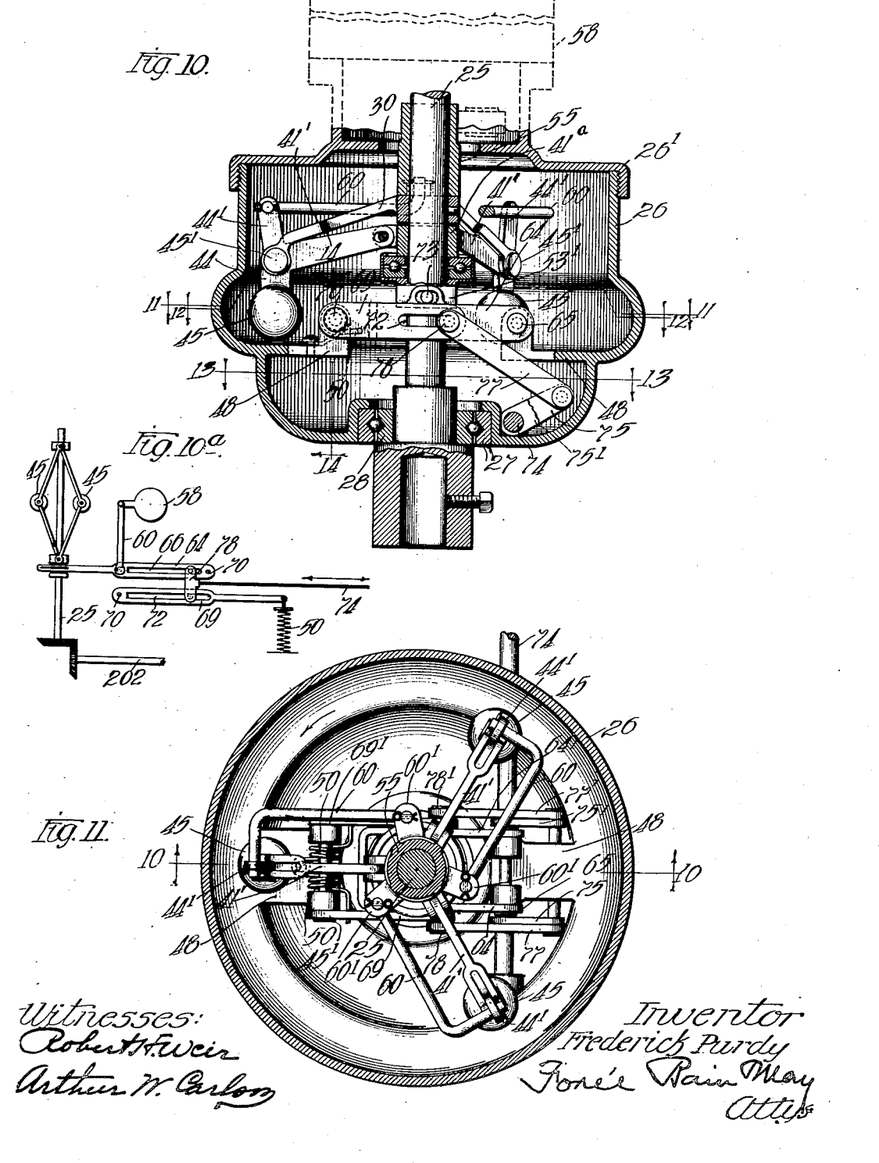
Figures 12, 15, 16:
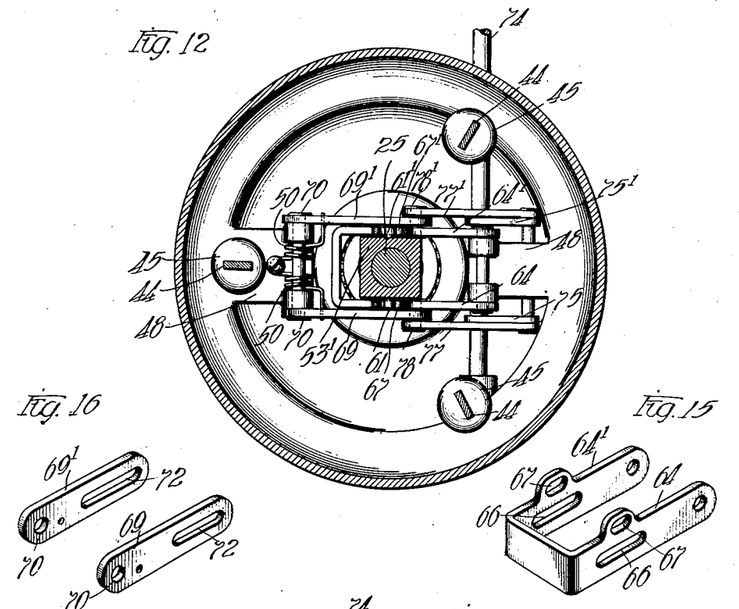
Fig. 12 is a section taken on line 12—12 of Fig. 10.
Figs. 15 and 16 are perspective views of the slotted link members, used to adjustably vary the effect of the spring of the speed responsive device with reference to the inertia weights thereof.
Figure 13:
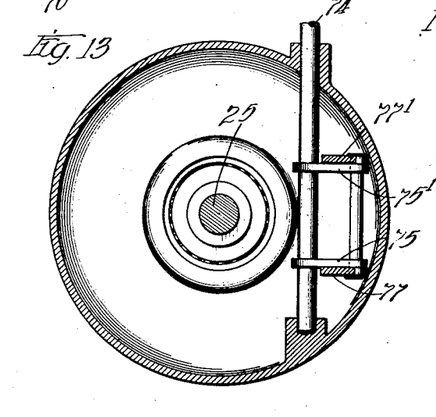
Fig. 13 is a section taken on line 13—13 of Fig. 10.
Figure 14:
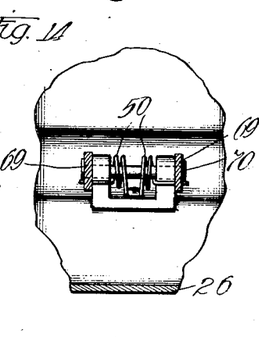
Fig. 14 is a section taken on line 14—14 of Fig. 10.

When centrifugal effect causes the inertia balls 45 to move radially outwardly, being pivoted as at 45', the arm 41' of each ball is depressed thereby depressing the collar 41ª, to which it is attached and at the same time rotating the sleeve 55, in a direction opposite to the direction of rotation of shaft 25, by means of the rod 60 connected to the arm 60' of the sleeve, in a manner clearly apparent from the drawings.

The proper manual movement of the shaft 74, and the bell crank 75 modifies the effect produced by the inertia balls and the resisting effect produced by the spring 50 for purposes to be hereinafter more fully described.

Figures 16, 17, 17A, 19:
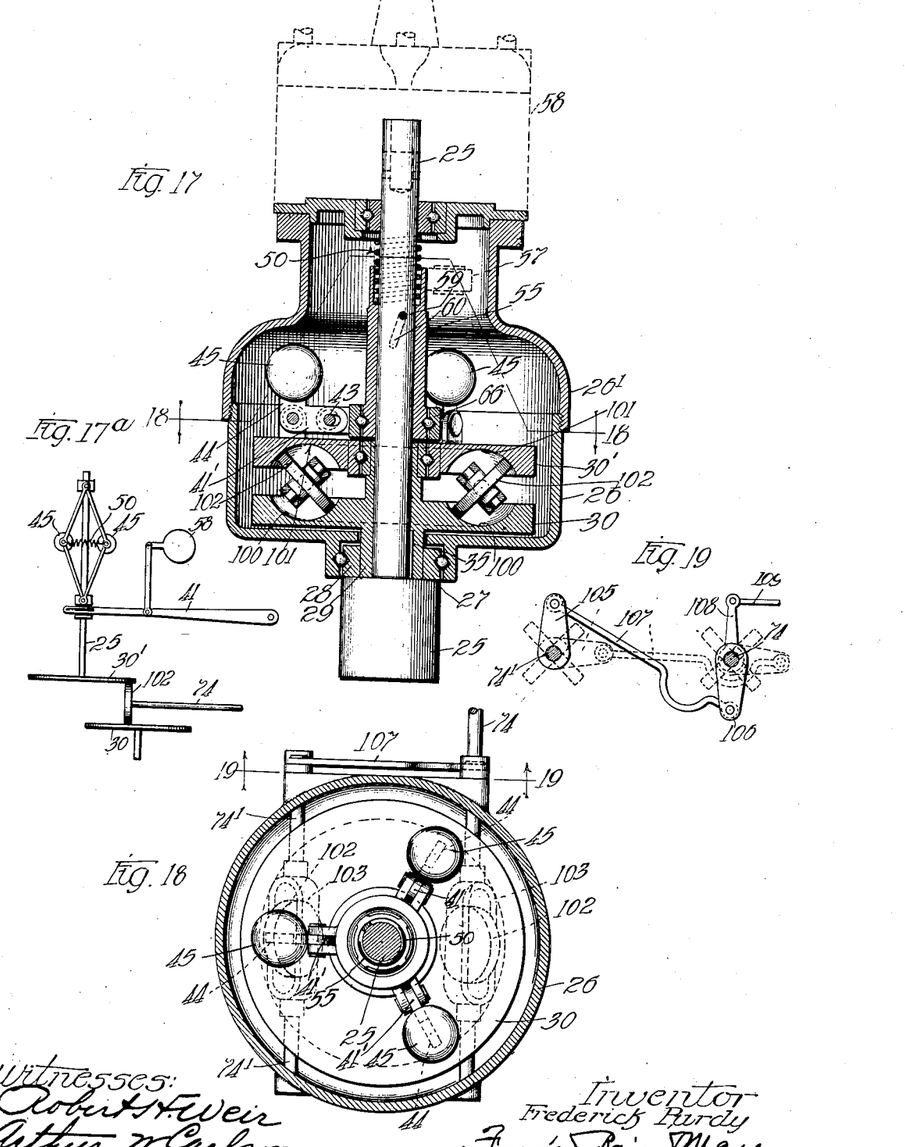

In Figs. 17 to 19 inclusive I show a further modification of my device wherein the speed of the responsive device or governor, by actuation of the shaft 74 is varied, to modify or automatically change the effect of the speed responsive device at a critical time upon the spark timing device.

In this construction, a disk 30 is secured to the rotatable shaft 25 by means of a key 35, or other suitable means. It is provided with an annular parti-circular groove 100 in its face. Another similar disk 30' is free to rotate about the shaft 25, upon the ball bearing supported upon the hub projecting from the sleeve 30 and is provided with a similar coacting registering annular groove, or depression 101 in its confronting face. Upon the disk 30' are mounted the governor balls 45 held in inner positions by spring 50, as in the former illustration and having arms 41' tending to hold the sleeve 55 in its most downward position.

Friction driving wheels 102, of which there are two, are positioned in the grooves 100, 101 and are the means by which variable speed or rotary motion is communicated from the disk 30' to the disk 30. The driving wheels 102, which may be made of leather or other similar suitable friction producing material, are axially mounted in buckles 103, which are parts of the shafts 74 and 74'. These shafts carry crank arms 105 and 106 respectively, connected together by a link 107, so that when shaft 74 is rotated, as by means of the arm 108 and the carbureter connecting rod 109, the shaft 74' is properly rotated by the connecting means.

When the driving wheels 102 are in the positions shown in Fig. 17, the disk 30 will drive the disk 30' at the lowest permissible relative speed, but if said wheels be rotated on their axes so as to occupy positions practically at right angles to the positions shown, then the speed ratio is changed and the reverse condition will be realized, that is to say, the disk 30 will then rotate the disk 30' at the highest permissible relative speed, tnereby changing or modifying the effect of the governor 45 with reference to the speed of the shaft 25.

When the disk 30' is rotated at a predetermined speed the governor balls 45 will fly out radially from the shaft 25, against the resilient action of the biasing spring 50 thereby lifting the sleeve 55 and rotating it in a direction opposite to that at which the shaft 25 is rotating, by means of the pin 59 projecting from the shaft 25 and into the slot 60, made in or through the sleeve 55, which operation tends to advance the spark or to cause the device 58 to make the spark in the cylinder of the engine at an earlier period of time than would otherwise occur if the speed of the governor had not thus been accelerated.

Figure 20:
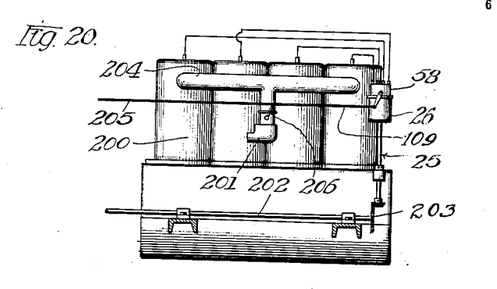
Fig. 20 is a side elevation of a conventional internal combustion engine showing my device attached thereto.

In Fig. 20, I have shown, conventionally, a gas engine 200, a carbureter 201, a cam shaft 202, operating through the train of gears 203 to rotate the vertical shaft 25 of the speed-responsive and spark-timing structure.

The carbureter is connected to the manifold 204 as usual, and is controlled by a manually shiftable rod 205. The rod 109 is connected to the throttle 206 of the carbureter and to the shaft 74 by a crank arm 108, or otherwise, to modify the operation of the speed-responsive and the spark-timing truc- ture when the throttle of the carbureter is moved.

Figures 21, 22:
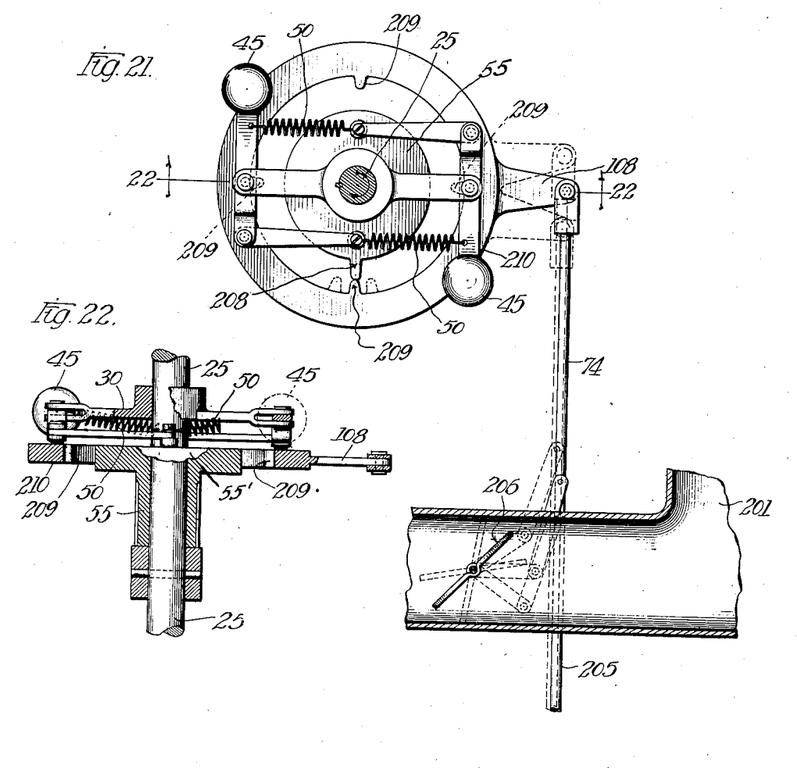
Fig. 21 is a diagrammatic view of another form of the devices showing its association with the carbureter.
Fig. 22 is a central section taken on line 22—22 of Fig. 21.

In Fig. 21 I have diagrammatically represented another structure wherein the rod 74, instead of being rotated, as in the previous examples, is axially moved, by means of the fuel controlling rod 205 which modifies the effect of the fuel supply through movement of the throttle 206.

In this device the governor balls 45, operating through pivoted levers tend to rotate the disk 55', which carries the distributing or commutating finger 208 with reference to the relatively shiftable sparking points 209, the latter being oscillated by the rod 74 and the connecting arm 108 when the rod 205 is axially moved by the same agency that opens and closes the carbureter throttle 206, to a greater or less extent.

Now it is apparent that when the carbureter throttle, or the fuel controlling means is manually changed, for the purpose of increasing or decreasing the fuel charge in the cylinder of an internal combustion engine, that the spark-timing means is automatically modified or affected by the connection between said fuel control means and by the operation of the speed responsive device, and while I have herein shown several different modifications of my preferred form, in which this may be accomplished, it will be apparent, to persons skilled in the art, that my invention is susceptible of many other variations than those shown and is capable of being embodied in various forms, limited only by the scope of the appended claims.

Having described my invention, what I claim is:

1. In a device of the character described, a spark-timing means and a speed-responsive means operatively associated with and organized to rotate about a common axis, in combination with a fuel controlling means and independently movable means to move the fuel controlling means and for varying the effect of the speed responsive means on the timing means.

2. In combination with a fuel controlling means; a structure comprising a spark-timing means and a speed-responsive means, operatively associated and mounted to rotate about a common axis; means for independently moving said fuel control means, and a connection between said independently movable means and said fuel controlling means to modify the operation of said structure to change the cyclic spark time.

3. In a device of the character described, a speed responsive means; driving means therefor; a spark-timing means mounted and rotatable coaxially with the speed responsive means; operative connections between the speed responsive means and the spark timing means to vary the cyclic time of the latter as the speed varies; a fuel control means; means for independently moving said fuel control means, and connections interposed between said driving means and the spark timing means responsive to movements of the fuel control means to vary the cyclic time of the spark timing means.

4. In combination with a fuel control means; a spark timing means including two relatively movable parts, one rotatable and the other oscillatable; a speed responsive device for changing the cyclic time of the rotatable part; means for independently moving said fuel control means, and a connection between said oscillatable part and said means for operating said fuel control means to oscillate the oscillatable part for variation of said cyclic time when said fuel control means is moved.

5. In combination with a fuel control means; a spark timing means including two relatively movable parts, one rotatable and the other oscillatable; a speed responsive device for changing the cyclic time of the rotatable part; means for independently operating said fuel control means, and a connection between said oscillatable part and said fuel control means to oscillate the latter for variation of cyclic time when said fuel control means is moved.

6. In combination with a fuel control means; a spark-timing means, including two relatively movable parts, one oscillatable and the other rotatable and oscillatable; a speed responsive means connected to the latter part to oscillate said part while rotating upon change of speed of said speed responsive part; means for independently moving said fuel control means, and an operative connection between said fuel control moving means and said first mentioned oscillatable part to modify the effect of the speed responsive means on the timing means.

7. In combination with an internal combustion engine having regulable fuel-control means, of a structure, comprising a speed-responsive means and a spark-timing means, rotatable about a common axis; a connection between said devices for movement whereby to automatically change the cyclic time of operation of said spark-timing means by movement of said speed-responsive means; means for independently moving said fuel control means and a connection between said fuel-control moving means and said structure to modify the operation of the latter when the former is moved.

8. A device of the character described comprising a speed-responsive means and a spark-time means rotatable about a common axis; a connection between said means whereby to automatically advance or retard the rotation of a part of the spark time means by operation of the speed-responsive means, in combination with a fuel-control means; means for independently moving said fuel control means, and a connection between said control moving means and said device to modify or change the time of cyclic operation of the latter by movement of said fuel control means.

9. In a device of the character described, the combination of a driving member, a speed responsive device, and a spark timing device, the latter having a rotating member connected with the driving member and connection between said speed responsive device and said rotating member to rotatively displace the latter with respect to the driving member to change the spark time.

10. A device of the character described comprising a speed responsive means, and a spark timed means rotatable about a common axis; a connection between said devices whereby to automatically advance or retard the rotation of a part of the spark timing means, to vary the cyclic time of the spark, by operation of the speed responsive means, in combination with a carbureter; a throttle therefor, means for independently moving the throttle and a connection between said throttle moving means and said device to modify or change the time of operation of the spark timing means by movement of said throttle moving means.

11. The combination of a regulable fuel-control means and sparking means, for an internal combustion engine of a structure comprising a spark-timing means and a speed-responsive means, the latter adapted to move said timing means in response to a change of a speed; means for independently moving said fuel controlling means, and a connection between said fuel-control moving means and said structure to change the ratio of movement of said timing means by the speed responsive means when said fuel control means is moved.

12. The combination of a regulable fuel-control means and sparking means, for an internal combustion engine, of a structure comprising a spark-timing means and a speed-responsive means, the latter adapted to move said timing means in response to change of speed; an adjustable means for biasing said spark timing means, yieldingly opposing movement of said speed-responsive means; means for independently moving said fuel control means, and a connection between said fuel-control moving means and said structure to change the effective operation of said biasing means to cause the spark to occur sooner or later in the cyclic operation of an engine, in harmony with the movement of said speed-responsive means and said fuel-control means.

13. The combination with a regulable fuel-control means and a sparking means for an internal combustion engine, of a structure comprising a spark-timing means and a speed-responsive means, mounted to revolve about a common axis; a connection between said speed-responsive means and said timing means to move a part of the latter in one direction upon increase of speed; an adjustable, opposing means to move it in the opposite direction upon decrease of speed, to vary the spark-time, means for independently moving said fuel control means, and a connection between said fuel-control moving means and said structure to modify the effect of said speed-responsive means on said spark-timing means to change the cyclic time of the spark.

14. The combination with a sparking means and a fuel-control means for an internal combustion engine, of a structure comprising a shaft to be driven at a speed proportional to the speed of an engine; a speed-responsive means and a spark-timing means normally rotatable about the axis of said shaft; a connection between said timing means and said speed-responsive means whereby to change their speed relation upon change of speed of said speed-responsive means; means for independently moving said fuel control means, and a connection between said structure and said fuel-control moving means whereby to modify the coöperative relation of said devices when said fuel-control means is moved to thereby vary the spark time.

15. The combination with a sparking means and a fuel-control means for an internal combustion engine, of a structure, comprising a stationary casing; a shaft therein to be driven at a speed proportional to the speed of an engine; a speed-responsive means and a spark-timing means, in said casing, normally rotatable about the axis of said shaft in like direction; a connection between said timing means and said speed-responsive means whereby to rotatively displace an operative part of said timing means upon change of speed of said responsive means to vary the spark time; means for independently moving said fuel control means, and a connection between said structure and said fuel-control moving means adapted and arranged to modify the conjoint effect of said speed-responsive means and said spark-timing means upon movement of said fuel control means.

16. An apparatus for association with a gas engine spark timer and throttle comprising; means for independently moving said throttle; a speed responsive member, a variable connection between the speed responsive member and spark timer, and means associated with the throttle moving means for varying said connection.

In testimony whereof I hereunto set my hand in the presence of two subscribing witnesses.

FREDERICK PURDY.

In the presence of—
 FORÉE BAIN,
 MARY F. ALLEN.